June 30, 1964   N. F. GEER   3,139,550
SLOT WEDGE RETAINER FOR ELECTRICAL WINDINGS
Filed Dec. 31, 1962

Inventor
Norman F. Geer
by W. C. Crutcher
His Attorney

United States Patent Office 3,139,550
Patented June 30, 1964

3,139,550
SLOT WEDGE RETAINER FOR ELECTRICAL WINDINGS
Norman F. Geer, Lynnfield, Mass., assignor to General Electric Company, a corporation of New York
Filed Dec. 31, 1962, Ser. No. 248,466
3 Claims. (Cl. 310—214)

This invention relates to an improved retainer wedging arrangement for windings disposed in the core slots of an electromagnetic device, and relates to an improved slot wedge arrangement for holding the stator armature bars of a dynamoelectric machine in place.

Conventionally, dynamoelectric machines employ laminated cores provided with open circumferentially spaced, longitudinal winding slots. The cores are usually made by assembling already slotted punchings or laminations into an assembly. The insulated conductors making up the winding are then inserted in the slots and held securely in place by wedges.

These wedges serve to hold the armature bars securely in place against the substantial electromagnetic and vibratory forces tending to dislodge them. Due to variations in the lamination punchings and also due to variations in the size of the armature bar caused by the manufacturing process, the wedge must compensate for these varying conditions and still hold the bar securely in place.

In order to provide tightness of the wedge in a transverse direction across the slot, it has been suggested to provide a longitudinal slit along a wedge of a molded resinous compound, such as described in U.S. Patent 2,569,278, issued to H. L. Barth on September 25, 1951, or to employ "herringbone" slits in the wedge sides as described in U.S. Patent 2,723,358, issued to V. R. Holmgren on November 8, 1955, both being assigned to the assignee of the present application. Such a wedge does not easily compensate for differences in radial bar dimensions below it, however, and to this end, filler strips of varying size have been employed between wedge and winding. Such a procedure causes added fitting time during assembly, and also such filler strips have been known to "work their way out" after the machine has been in service for some time. If it is desired to tighten such prior art wedges after the machine has been in service for some time, the conventional type wedges must be removed and thicker filler strips added, after which the wedges are reinserted.

Accordingly, one object of the present invention is to provide an improved wedging arrangement for securing a winding in the slot of an electromagnetic core.

Another object of the invention is to provide an improved wedging arrangement which compensates for both transverse and height-wise variations between the winding and the slot.

Still another object of the invention is to provide an improved wedging arrangement in which the winding can be tightened within the slot without removing the wedges.

Yet another object of the invention is to provide an improved wedging arrangement which is easy to assemble and yet which will not come out of the slot inadvertently after assembly.

Briefly stated, the invention is practiced by providing wedge members of two types which alternate along the slot. One type is arranged with longitudinally inclined surfaces to exert downward pressure on the winding when the second type of wedge is forced against it by being driven longitudinally along the slot toward the center of the machine. The latter wedge is preferably provided with slanting slits which add resiliency to the sides of the wedge to provide transverse tightness and to discourage the wedge from coming out of the slot, once inserted.

The organization and operation, together with further objects and advantages of the invention, may best be understood by reference to the following description, taken in connection with the accompanying drawings in which.

Figure 1:
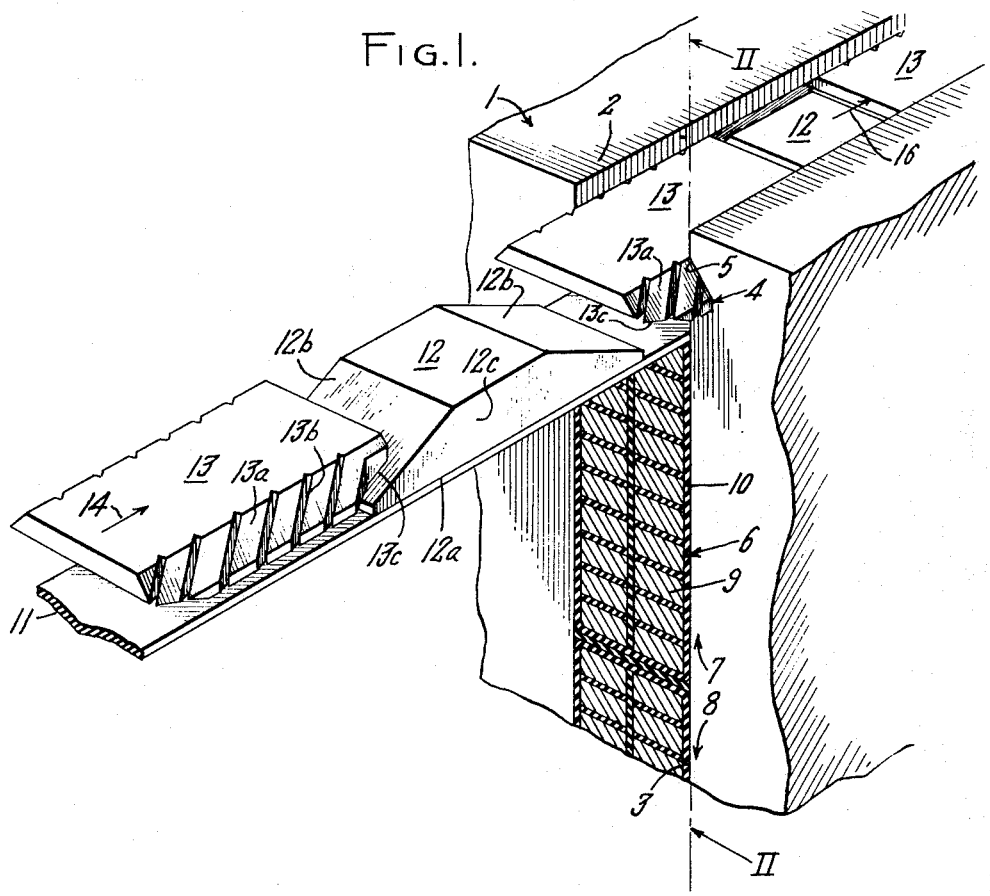
FIG. 1 is an exploded perspective view indicating the method of assembly.

Referring now to FIG. 1 of the drawing, an electromagnetic core structure 1, made up of stacked laminations or punchings 2, has a number of rectangular slots, one of which is seen at 3. The tops of slots 3 are open and each side of slot 3 has a dovetail groove 4 formed therein near the top, which includes a transversely inclined surface 5 extending longitudinally along the slot.

Disposed in slot 3 is a winding shown generally as 6, which may be of any suitable type according to the desired characteristics of the electromagnetic device. As shown here, the winding 6 is for a dynamoelectric machine, and includes top and bottom armature bars 7, 8 respectively, having lightly insulated strands 9 surrounded by a compacted sheath 10 of ground insulation.

An insulating filler strip 11 extends longitudinally along the slot on top of the top bar 7. Disposed longitudinally along the slot on top of filler strip 11 are a number of "pressure" wedges 12. Alternating between pressure wedges 12 are a number of longitudinally spaced "herringbone" wedges 13. Wedges 12 and 13 are so arranged and constructed to cooperate with one another to provide the improved wedging system which is the subject of the invention.

Each pressure wedge 12 has a flat bottom surface 12a resting on filler strip 11 and has longitudinally inclined surfaces 12b on either end thereof. Although the slope of the longitudinally inclined surfaces 12b will vary with the application and type of material of wedge 12, a suitable slope is provided with an angle of 20 degrees included between surfaces 12a and 12b for a molded resinous wedge. The transverse sides 12c of wedges 12 are preferably vertical.

Cooperating with wedges 12, wedges 13 have transversely inclined sides 13a having substantially the same angle as inclined surfaces 5 along the slot. The transversely inclined surfaces 13a are provided with a number of diagonally-extending herringbone cuts or "kerfs" 13b. Wedges 13 are wider than wedges 12, so that opposite edges will fit in dovetail grooves 4. The width of wedges 13 is such that wedges 13 can be driven longitudinally along dovetailed grooves 4 in the sides of the slots, with the kerfs 13b providing slight resiliency, or "springiness," so as to allow the wedges 13 to accommodate variations in widths of grooves 4, as described in the aforementioned Patent 2,723,358. It will be apparent that other types of grooves might be used in place of grooves 4, with the sides of wedges 13 appropriately constructed to fit tightly within the grooves.

It will be observed that if the wedges 13 are driven in the direction indicated by arrow 14 in FIG. 1, the herringbone cuts 13b will permit this motion, but that if wedges 13 tend to move in the other direction, the sides of the wedge will extend or enlarge in a transverse direction and tend to prevent such motion.

Figure 2:
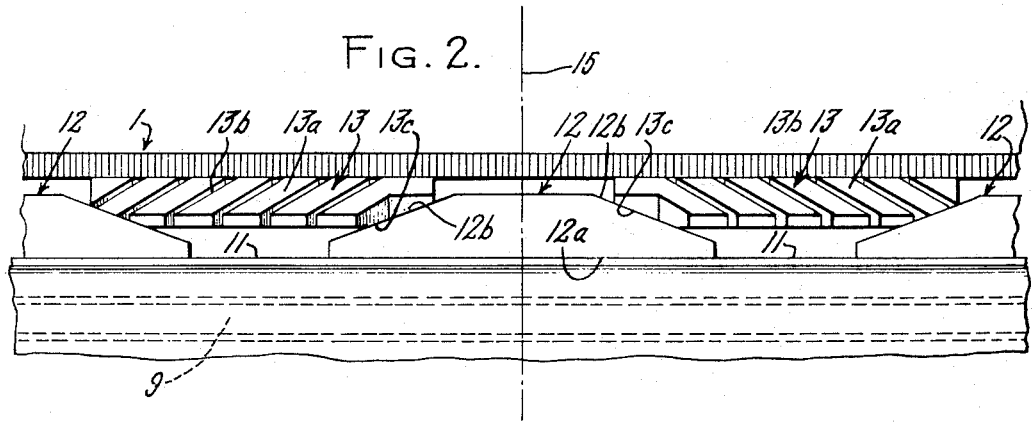
FIG. 2 is a horizontal elevation, looking from one side of the slot toward the other, at the center of the dynamoelectric machine.

The undersides of wedges 13 are longitudinally inclined at either end of the wedge, as indicated at 13c (see also FIG. 2). The slope of longitudinally inclined end surfaces 13c is the same as that of inclined surfaces 12b, and an up-and-down force is produced between the top of the slot and the top of the winding by means of the inclined plane action when the wedges 13 are driven longitudinally against wedges 12.

The material of wedges 12 and 13 is preferably of high strength insulating material which can be cut or molded to the shapes described. Wedges 12, 13 are preferably formed of a molded resinous compound employing a suitable filler to add strength, or can be made from many commercially obtainable materials, such as "Textolite" (a registered trademark of the General Electric Company).

Reference to FIG. 2 of the drawing indicates the disposition of wedges 12, 13 along the slot of the electromagnetic core. The longitudinal centerline of the slot is indicated at 15 and it will be observed that the herringbone slots 13b are pointed from opposite directions toward the centerline 15.

The method of assembly of the improved wedging arrangement is as follows. The first "pressure" wedge 12 is placed at the centerline, and "herringbone" wedges 13 are inserted from either end and driven along dovetail grooves 4 until longitudinally inclined wedging surfaces 12b, 13c are contiguous. The wedges 13 can then be driven toward the center of the machine from the open part of the slot at the location indicated by arrow 16 in FIG. 1. Due to the oppositely directed herringbone "kerfs" 13b, wedges 13 will tend to remain in position, while the pressure wedge 12 will be forced downward or in a radial direction in the slot.

Next, additional pressure wedges 12 are inserted from either end of the slot on top of filler strip 11, and moved along the slot until inclined surfaces 12b slide beneath surfaces 13b of the previously inserted wedges 13, as indicated in FIG. 2. The next set of herringbone wedges 13 is then inserted from either end and driven toward the center to force pressure wedges 12 downward on the winding. The newly inserted wedges 13 also provide additional longitudinal holding force to aid that of the previously inserted set of herringbone wedges. This operation proceeds until the ends of the slot are reached.

In operation, the cooperating wedges 12, 13 hold the winding securely in place and there is substantially no tendency of the wedges to work longitudinally out of the slot, due to the "one way" action of the herringbone wedges 13. In the event the winding later becomes loose in the machine due to aging or for other reasons, the entire wedging arrangement can be very easily tightened by merely starting at the centerline of the machine and driving each succeeding wedge 13 toward the centerline from either side, working toward the opposite ends of the machine.

Due to the ability of the wedge combination to accommodate a great number of radial variations, various size filler strips need not be employed as was necessary with previous constructions. Only two types of wedges are needed. The herringbone wedges on one end of the machine are merely being turned end-for-end at the other end of the machine to provide the arrangement shown in FIG. 2. The ease with which the winding can be tightened in the slots should be readily apparent from the drawings, and represents a substantial saving in time over previous constructions.

While there has been illustrated herein what is considered to be the preferred embodiment of the invention, various other modifications will occur to those skilled in the art, and it is desired to cover in the appended claims all such modifications as fall within the true spirit and scope of the invention.

What I claim as new and desire to secure by Letters Patent of the United States is:

1. In an electromagnetic core defining a longitudinal slot with longitudinal grooves in the side walls near the top of the slot, said slot having a winding disposed therein, the combination of:

a plurality of longitudinally spaced first wedge members disposed on top of the winding and each defining longitudinally inclined first wedge surfaces on opposite ends thereof, and a plurality of longitudinally spaced second wedge members disposed between said first wedge members and each defining longitudinally inclined second wedge surfaces contiguous and cooperating with the first wedge surfaces, said second wedge members having opposite sides constructed to fit tightly in said side wall grooves of the slot, whereby pressure on the winding toward the bottom of the slot is exerted by the first wedge members when the second wedge members are forced longitudinally along said slot grooves.

2. In an electromagnetic core defining a longitudinal slot having transversely inclined side portions near the top of the slot, said slot having a winding disposed therein, the combination of:

a plurality of longitudinally spaced first wedge members disposed on top of the winding and each defining longitudinally inclined first wedge surfaces on opposite ends thereof, and a plurality of longitudinally spaced second wedge members disposed between said first wedges and each defining longitudinally inclined second wedge surfaces contiguous and cooperating with the first wedge surfaces, said second wedge members also defining laterally inclined side portions on either side thereof arranged to cooperate with the transversely inclined slot sides to resist upward force on the second wedge members from the bottom of the slot, said second wedge member side portions also being constructed to resist movement in one direction along the slot.

3. In an electromagnetic core defining a longitudinal slot with dovetail side wall grooves near the top of the slot, said slot having a winding disposed therein, the combination of:

a plurality of longitudinally spaced first wedges having flat bottom surfaces disposed on top of the winding along the slot and each defining longitudinally inclined first wedge surfaces on opposite ends thereof, and a plurality of longitudinally spaced second wedges disposed between said first wedges along the slot, and each defining longitudinally inclined second wedge surfaces contiguous and cooperating with the first wedge surfaces, said second wedges also defining laterally inclined dovetail side portions arranged to fit in the dovetail grooves of said slot, the second wedges at one end of the slot defining a plurality of herringbone slits in said transversely inclined dovetail side portions which are oriented in an opposite direction from similar herringbone slits in the second wedges at the other end of the slot, said slits being arranged to favor longitudinal movement of the second wedges toward a central part of the slot from the ends thereof, whereby said second wedges may be driven from either end of the slot to increase and maintain pressure by the first wedges on the winding toward the bottom of the slot.

No references cited.